Patented June 20, 1939

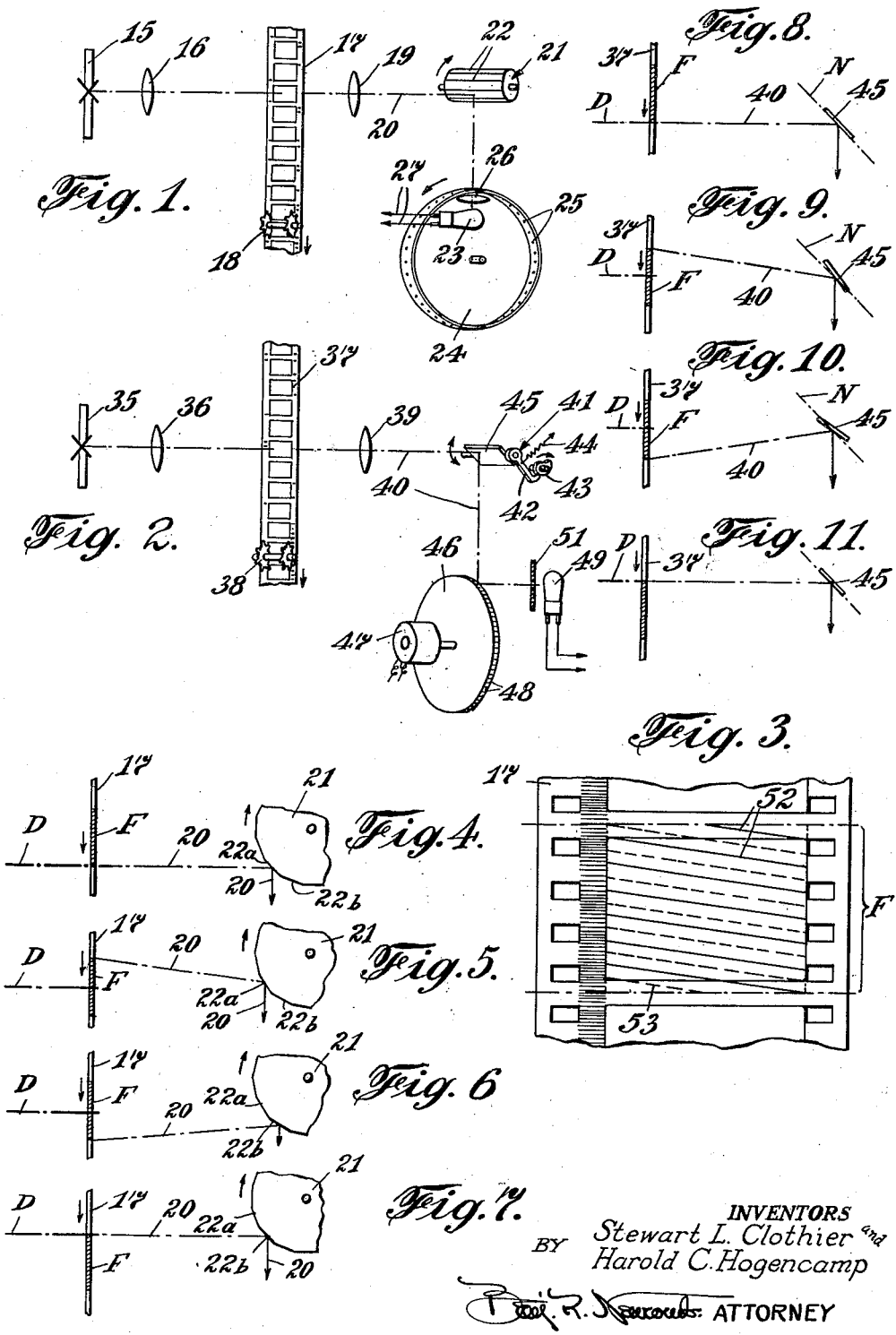

2,163,541

UNITED STATES PATENT OFFICE 2,163,541

METHOD OF AND APPARATUS FOR INTERLACED SCANNING

Stewart L. Clothier, Irvington, and Harold C. Hogencamp, Maplewood, N. J., assignors to Kolorama Laboratories, Inc., Newark, N. J., a corporation of New Jersey Application May 9, 1936, Serial No. 78,904

9 Claims. (Cl. 178—7.6)

This invention relates to television and more particularly to improved methods of and apparatus for producing interlaced scanning of motion picture film.

It is customary when scanning motion picture film for television purposes, to move the film at a constant rate of speed with respect to the scanning device. Interlaced scanning has already been employed successfully to reduce flicker, but its use heretofore has involved deviating from standard practices. For example, interlaced scanning has been accomplished by moving the film at twice normal speed. However, this practice necessitated the use of specially prepared film having duplicate frame prints to permit the action to be reproduced at normal speed, and also required a specially prepared sound track. Another very apparent disadvantage was that twice as much film was required.

According to the present invention it is possible to produce interlaced scanning of standard motion picture film having all the inherent advantages of previously tried methods without requiring any change in the preparation or speed of travel of the film over that normally employed.

Accordingly, the principal object of the present invention is the provision of simplified methods and apparatus for producing interlaced scanning; a second object is the provision of methods and apparatus for producing interlaced scanning of motion picture film operating at normal rate of travel. Further objects and advantages will become readily apparent to those skilled in the art from the following description and the accompanying drawing showing the manner in which the invention may be applied to use.

In the drawing:

Fig. 1 is a diagrammatic view of a television scanning apparatus embodying features of the present invention.

Fig. 2 is a diagrammatic view of another version of television scanning apparatus incorporating features of the present invention.

Fig. 3 is an elevational view of a single frame of a standard motion picture film showing diagrammatically the path covered by the interlaced scanning means.

Figs. 4, 5, 6 and 7 are diagrammatic views showing portions of a film and scanning device according to the form of the invention shown in Fig. 1, operating through the various stages constituting a single cycle.

Figs. 8, 9, 10, and 11 are diagrammatic views showing portions of a film and scanning device according to Fig. 2, operating through a single cycle.

Generally speaking the invention comprises methods and apparatus whereby the motion picture film and one scanning device are moved in opposite directions, the effective relative motion being substantially twice that of either the film or the scanning device.

Referring again to the drawing and more particularly to Fig. 1, one form of scanning apparatus embodying principles of the invention comprises a concentrated light source 15, such as an electric arc or incandescent filament. Suitably spaced from the light source 15 and optically aligned therewith is a converging lens or similar optical means 16 capable of projecting a beam of light 20 of the desired size and configuration, from the light source 15 through the standard motion picture film 17. A pair of toothed wheels, or sprockets 18 are rotated at constant angular velocity, by any known or convenient means, and engage the perforations along the marginal edges of the film 17 to move the film at a continuous rate of speed in a downward direction as indicated by the arrow. A second converging or projection lens 19 intercepts the light beam 20, represented diagrammatically in broken lines in Fig. 1, after it has passed through the film 17, and projects the beam against a rotatable drum 21.

The drum 21 may consist of a right prism bounded by a plurality of reflecting or mirrored surfaces 22 as disclosed in our copending application Serial No. 50,316, filed November 18, 1935. A synchronous motor or other similar prime mover, (not shown), is provided to rotate the drum at a predetermined rate of speed in the direction indicated by the arrow, as will be more fully described later. The light beam 20 is reflected from the respective surfaces 22 and forms an image of the film on the surface of a rotatable line or linear scanner 24, provided with a plurality of concentrically aligned apertures 25. A lens 26, positioned behind the scanner 24, collects the light passing through the apertures 25 and converges the rays on a photocell 23 mounted directly adjacent to the lens 26. Terminal connections 27 are provided to conduct the electrical responses from the photocell 23 to a suitable amplifier. The scanner 24 is rotated about an axis generally perpendicular to the axis of the drum 21 at a predetermined speed, in the direction indicated by an arrow, through the use of a synchronous motor or other convenient means.

In Fig. 2 of the drawing, a slightly modified form of apparatus embodying the invention is shown. This arrangement is similar to the apparatus shown in Fig. 1 in that it comprises a light source 35 represented in the drawing as an electric arc, and a condensing or converging lens 36 for forming a beam or pencil of light 40 which is projected through a standard motion picture film 37. The film 37 is moved vertically downward, when looking at Fig. 2, by means of sprocket wheels 38, rotated at continuous angular velocity by any convenient means. A second lens 39 situated on the side of the film opposite the light source 35 projects the light beam 40 onto a reciprocating frame scanner 41, preferably mounted so as to pivot upon or about a substantially horizontal axis contained in a plane generally parallel to the plane of the film. The reciprocating scanner 41 comprises a pivot arm 42 which is normally held against a rotatable cam 43 by means of a tension spring 44. Means are provided to rotate the cam 43 in the direction indicated by an arrow at a predetermined rate of speed in any conventional manner. As the cam rotates, the reflecting surface or mirror 45 of the reciprocating scanner 41 is caused to oscillate about its axis, preferably being moved slowly upward at a constant angular velocity and being quickly returned to the initial position during each cycle.

The beam of light 40 is reflected from the mirror 45 upon the periphery of a disc 46 rotatable about an axis generally perpendicular to the axis of the frame scanner 41 by means of a synchronous motor or other similar prime-mover 47. The disc 46 is provided about its periphery with a plurality of reflecting surfaces 48 each of which is identical with every other and normal to a radius of the disc 46. Preferably the disc 46 is positioned so that an image of the light source appears on, and covers at least one of the mirrored surfaces 48. The construction of a suitable reciprocating frame scanner 41 and disc 46 is clearly disclosed in our copending application Serial No. 50,316 filed November 18, 1935.

The light beam 40 is reflected from the periphery of the disc 46 upon a photocell 49, the terminals 50 of which extend to a suitable amplifier. An aperture of iris 51 is positioned in alignment with the beam 40 between the disc 46 and the photocell 49, and an image of the film 37 is focused upon the surface of the aperture plate.

The operation of the device illustrated in Fig. 1 may be more clearly understood by reference to Figs. 4 to 7 inclusive of the drawing, representing in diagrammatic form, one cycle of operation. In these views a single frame F of the standard motion picture film 17 is shown shaded, and the film is assumed to be moving in a downward direction as indicated by the arrows with respect to an arbitrarily chosen datum line D. The drum 21 meanwhile is rotating in a direction opposite to the direction of movement of the film 17 as indicated by the arrow. Although the film is shown moving downwardly and the drum 21 is represented as rotating about a horizontal axis it is to be understood that the invention will operate equally well with the film moving longitudinally in a horizontal direction and with the drum rotating about a vertical axis, as the action is identical as long as the disclosed relationship is maintained. In the initial position indicated in Fig. 4, the bottom of the frame F is coincident with the datum line D and the first mirrored surface 22a is positioned so as to scan the bottom edge of the frame F. In the position indicated in Fig. 5 the film has moved downwardly a distance equal to one-half of the height of the frame F and the drum 21 has rotated in a clockwise direction to an intermediate position so that it now scans the upper edge of the frame F. During this portion of the cycle of operation the mirror surface 22a has moved upwardly and the frame F has moved downwardly and one complete vertical or frame scanning action has been completed, although the frame F has moved but halfway with respect to the datum line D. The position of the respective parts shown in Fig. 6 is identical with the position of the parts shown in Fig. 5. At this stage of the cycle, however, the surface 22b has moved to a position at which the second scanning of the bottom of the frame F starts. In the position shown in Fig. 7 the vertical movement of the film 17 through a single frame with respect to the datum line D has been completed. In the meantime the surface 22b has moved so as to occupy the position originally held by the surface 22a at the start of the cycle. The film 17 has therefore moved a distance equivalent to one frame, and the rotatable drum 21 has advanced through an arc subtended by one surface and the frame F has been scanned successively by both surfaces 22a and 22b. In short, the frame F has been scanned twice during a movement equivalent to one frame. In the position indicated in Fig. 7, the device is arranged to inaugurate the scanning of the succeeding frame of the film 17 adjacent to the frame F. It will be noticed that during one cycle the drum 21 advances one surface. If $n$ surfaces are used about the periphery, this arcuate movement may be represented by the fraction $360°/n$. The light beam 20, although designated in the drawing as a line to illustrate the operation of the invention, is in reality of sufficient size to illuminate an entire frame. The beam 20 is reflected from the drum 21 as indicated in Figs. 4 to 7 inclusive onto the line scanner 24 and photocell 23, as previously described.

The operation of the form of the invention shown in Fig. 2 may best be understood by reference to Figs. 8 to 11 inclusive. In these figures the film 37 is presumed to be moving downwardly in the direction indicated by the arrow with respect to a datum line D, and the mirror 45 is shown oscillating about a horizontal axis with respect to a normal line N, represented in the views as a broken line. In Fig. 8 the bottom of the frame F is coincident with the datum line D and the mirror 45 is in a plane coincident with the normal line N. Fig. 8 represents the start of a cycle wherein the mirror 45 scans the lower edge of the frame F. Fig. 9 represents a condition during an intermediate stage of the cycle wherein the frame has advanced downwardly a distance equal to one-half its height, and the mirror 45 has pivoted at continuous angular velocity in a clockwise direction away from the normal line N. During this stage of the cycle the film 37 and the mirror 45, moving in opposite directions, have contributed to complete the first scanning of the frame F. The position of the mirror 45 in Fig. 9 represents the maximum stroke of the pivot arm 42. Upon reaching this position the mirror is returned substantially instantaneously to the position indicated in Fig. 10 during which time the film 37 moves but a negligible amount. The quick return motion of the mirror is arranged to take place while the frame line or space between two adjacent pictures is being scanned linearly. In the position indicated in Fig. 11, film 37 has advanced until the top of the frame F is coincident with the datum line D and the mirror 45 has returned to the position indicated in Fig. 8, thus completing one cycle. The mirror, while moving from the position indicated in Fig. 10 to the position indicated in Fig. 11 has completed the second scanning of the frame F although the film has advanced a distance equivalent to but half a frame.

It will be observed that in either of the foregoing cases, by virtue of the film and the mirrors moving in opposite directions, each frame of the film is scanned twice while advancing a distance equivalent to but a single frame.

Since both the linear scanner 24 and the disc 46 are rotatable upon axes perpendicular to the respective axes of the drum 21 and the reciprocating scanner 41, scanning at right angles is obtained thereby. Both the drum 21 and the frame scanner 41 operate to scan the film vertically, that is, to perform frame scanning. Subsequently, the line scanners 24 and 46 respectively, resolve the image into a series of separate light impulses, which are properly transmitted to the photocell.

In order to obtain the interlacing effect during scanning it is simply necessary to stagger the second vertical scanning of each frame with respect to the first scanning. This action is diagrammatically shown in Fig. 3 of the drawing wherein the frame F is represented as having been scanned first by the solid line 52 and subsequently by the broken line 53. The staggered relation may be obtained with the present invention by having an odd number of total lines for each frame. For purposes of illustration, the frame F has been shown in Fig. 3 as scanned by thirteen lines. Hence the first scanning consists of six and one-half lines and the second scanning consists of six and one-half lines staggered with respect to the first scanning. This effect may be obtained by inaugurating the scanning of a single frame at the middle of the top edge as shown in Fig. 3 and having the line terminate in the lower right hand corner of the frame. A frame is presumed to extend from the middle of one frame line to the middle of an adjoining frame line. During the second scanning, the line commences at the upper left hand corner of the frame and terminates at the middle of the bottom edge thereof. In order to obtain an odd number of lines the line scanner 24 or the disc 46 is rotated at such speed that when the film has moved a distance equivalent to one frame an odd number of linear scans has been completed. By way of illustration, the line scanners 24 or 46 may be provided with 180 light receiving means such as the respective apertures or surfaces 25 and 48, and the scanners may be rotated at 1800 revolutions per minute so as to resolve the picture into 225 lines per frame when normal film movement of twenty-four frames per second is used. Since each frame is scanned twice, in the manner already described, each scanning of the film comprises 112½ lines, if the foregoing conditions are observed. Similar results may be obtained with other linear scanning speeds, with more or less light receiving means on the linear scanners, and with other film speeds. In any case, each frame is scanned, during the two scanning actions comprising an entire cycle, by an odd number of lines.

Although but thirteen lines have been shown to a frame in Fig. 3 for purposes of illustration it is to be understood that by properly controlling the speed of the line scanners and by providing sufficient apertures in the disc 24 and surfaces on the disc 46 as many lines may be obtained as is desired. A single motor may be employed to drive the respective elements at the predetermined speed, or separate synchronous motors may be employed, for example, to rotate the sprockets 18, the drum 21 and the disc 24. It is to be understood, of course, that the moving elements must be properly synchronized with the prime-mover operating the receiver mechanism.

Furthermore, we may interchange any of the elements in one arrangement of the invention with corresponding elements in another form of the invention. Accordingly, the frame scanner 41 may be employed with the arrangement shown in Fig. 1 to replace the drum 21, or the disc 46 may be substituted for the line scanner 24. If desired, an oscillograph mirror, preferably actuated by a saw-tooth shape wave, may be employed as a frame scanner. The reciprocating scanner 41 preferably is provided with a mirror of the first-surface type so as to minimize distortion.

It is to be understood that various modifications of the herein disclosed arrangements will occur to those skilled in the art and that the present invention is not to be limited by the disclosure, as we contemplate any method and structure properly within scope of the appended claims. For example, the positions of the light source and the photocell may be interchanged and other similar revisions made without departing from the spirit of the invention.

We claim:

1. The method of scanning motion picture film which includes the steps of continuously moving the film unidirectionally while projecting a beam of light through the same, frame scanning with a motion opposite to film motion, line scanning transverse to film motion, and adjusting the relative rates of motion for double scanning each film frame in a vertical direction while line scanning each film frame into an odd number of interlaced lines.

2. The method of scanning motion picture film which includes the steps of continuously moving the film unidirectionally while projecting a beam of light through the same, frame scanning with a motion opposite to film motion, line scanning transverse to film motion, and adjusting the relative rates of motion for double scanning each film frame in a vertical direction while line scanning each film frame into an odd number of interlaced lines during a time interval representing a single frame movement of the film.

3. The method of interlaced scanning of motion picture film comprising projecting a beam of light from a source through the film to be scanned and onto a reflecting surface, moving the film longitudinally in one direction at a continuous speed, moving the reflecting surface angularly in a direction opposite to that of the film movement about an axis positioned generally parallel to the film, adjusting the rate of movement of the reflecting surface in relation to the rate of movement of the film so as to produce double frame scanning, linearly scanning the beam reflected from the surface, and adjusting the rate of movement of the linear scanner so that an odd number of lines are formed during the time interval in which the film moves a distance of one frame of the film.

4. Method according to claim 3 wherein an image of the light source is formed on the surface of the linear scanner.

5. In the method of scanning motion picture film the step comprising projecting a beam of light through the film to be scanned onto a rotating reflecting device having $n$ reflecting surfaces, continuously moving the film longitudinally in one direction a distance equivalent to one frame, and simultaneously therewith rotating the reflecting device in a direction opposite to the direction of movement of the film and through an arc of $360°/n$, where $n$ represents the number of reflecting surfaces on said rotating reflecting device, to effect double scanning of each individual frame of the film, and scanning each frame of the film in a direction transverse to film movement into an odd number of lines.

6. Apparatus for producing interlaced scanning of motion picture film comprising means for continuously moving a film longitudinally, frame scanning means movable in a direction opposite to the direction of movement of the film, said frame scanning means being so adjusted and arranged in co-operation with the movement of the film so as to complete two frame scans during the time the film advances a distance equal to one frame, and line scanning means, said line scanning means being so adjusted and arranged as to form an odd number of lines for each frame.

7. Apparatus for producing interlaced scanning of film comprising means for continuously moving a film longitudinally, frame scanning means movable in a direction opposite to the direction of movement of said film, power means for moving said frame scanning means in co-operation with the movement of the film at such a rate as to complete two frame scans while the film advances a distance equal to one frame, line scanning means, and power means for moving said line scanning means transversely with respect to the movement of said film at such a rate as to form an odd number of lines for each frame.

8. Apparatus for producing interlaced scanning of motion picture film comprising means for continuously moving the film longitudinally, frame scanning means movable in a direction opposite to the direction of movement of the film, means whereby the respective movements of the film and said frame scanning means complete two frame scans while the film advances a distance equal to one frame, line scanning means, and power means for moving said line scanning means transversely with respect to the movement of said film at such a rate that each frame of the film is resolved into an odd number of lines.

9. Apparatus for producing interlaced scanning of motion picture film which comprises a source of illumination, means for projecting a beam of light from said source thru the film onto a reflecting surface, and for forming an image of said source on or closely adjacent said surface, means for moving the film at a continuous speed, means for moving said reflecting surface arcuately in a direction opposite to and in synchronism with the motion of the film so as to produce double frame scanning of the film, an aperture plate, optical means interposed in the path of the light beam to form an image of the illuminated portion of the film on said aperture plate, line scanning means in the path of said light beam, means for moving said line scanning means at proper speed to produce odd-line interlaced scanning of each frame of the film, and means positioned behind said aperture plate to translate the elemental areas of the scanned image into electrical fluctuations.

STEWART L. CLOTHIER.
H. C. HOGENCAMP.